United States Patent [19]

Kropp

[11] Patent Number: 5,629,488

[45] Date of Patent: May 13, 1997

[54] FORCE SENSOR AND METHOD OF MAKING SAME

[75] Inventor: Harry C. Kropp, Barrington, Ill.

[73] Assignee: Breed Automotive Technology, Inc., Lakeland, Fla.

[21] Appl. No.: 577,427

[22] Filed: Dec. 22, 1995

[51] Int. Cl.$^6$ .................................................. G01L 1/00
[52] U.S. Cl. .................................. 73/862.68; 73/862.625
[58] Field of Search ................ 73/862.625, 862.636, 73/862.637, 862.638, 865.7, 862.68; 338/47, 48

[56] References Cited

U.S. PATENT DOCUMENTS 3,174,125  3/1965  Curby ......................................... 338/47
4,479,392  10/1984  Froeb et al. .............................. 338/47
4,729,809  3/1988  Dery et al. ................................ 338/47

*Primary Examiner*—Richard Chilcot
*Assistant Examiner*—R. Biegel

[57] ABSTRACT

A force sensor and method for making same. A pair of backing sheets having confronting surfaces are substantially covered with conductive ink to form a pair of conductive layers. At least one of the conductive layers is coated with a semiconductive ink. The backing sheets are secured to each other with an interposed layer of non-conductive or insulative material, such as adhesive. The layer of non-conductive material is deposited in a pattern and defines at least one sensing area. Only when orthogonal force is exerted against the backing sheets at a location corresponding to the sensing area will current flow between the conductive layers.

21 Claims, 3 Drawing Sheets

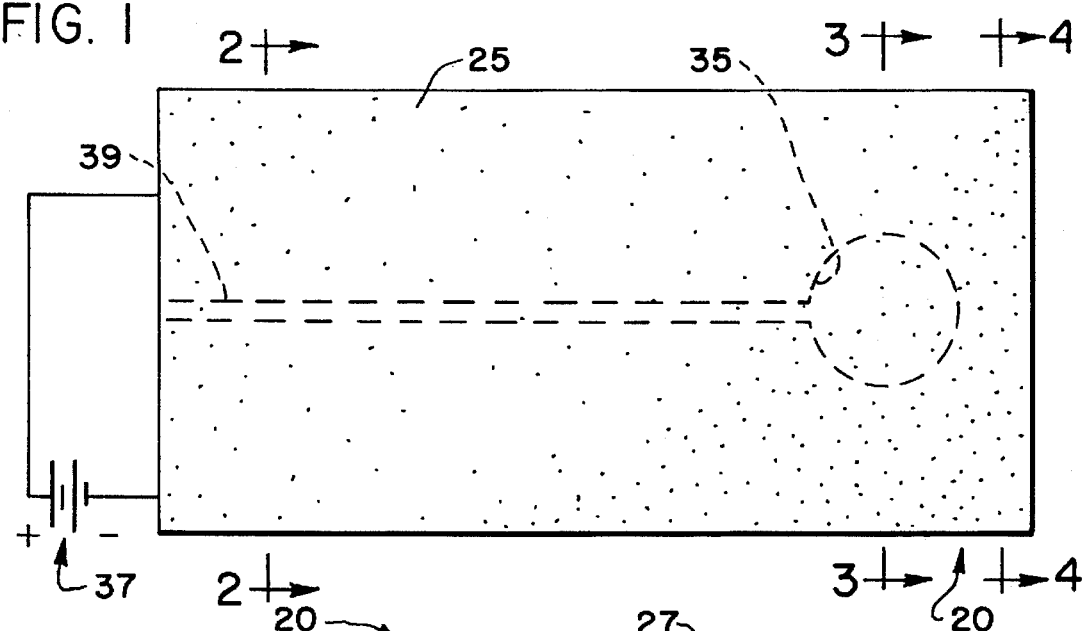
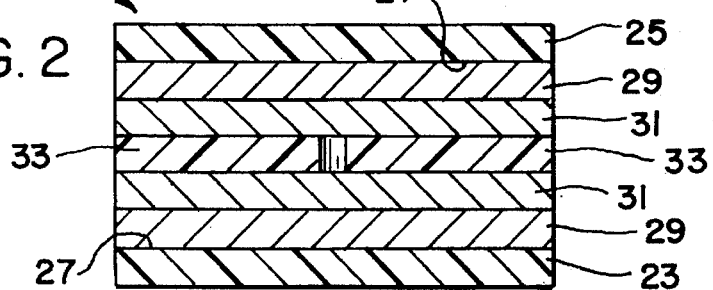
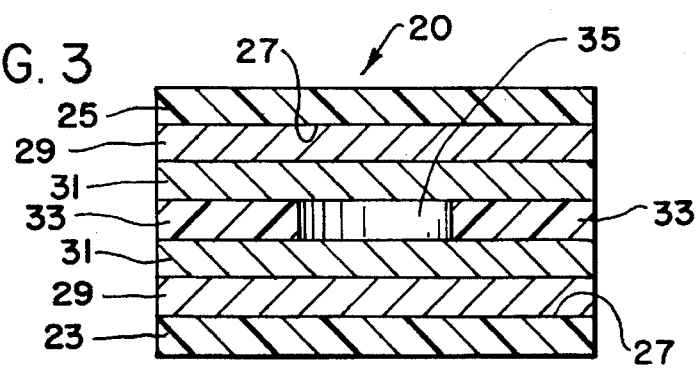
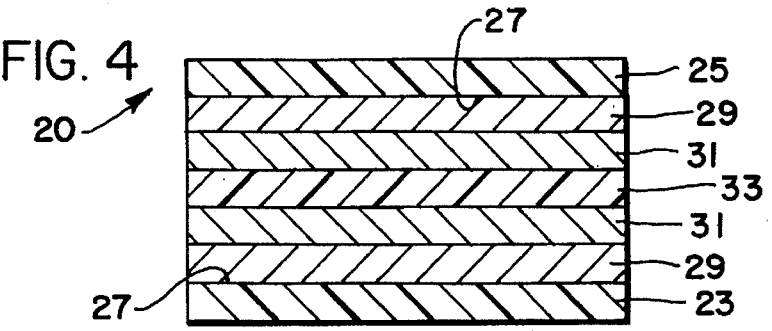

FORCE SENSOR AND METHOD OF MAKING SAME

FIELD OF THE INVENTION

This invention relates to force sensors and methods of making same.

BACKGROUND

Load or force sensors typically use a pair of facing plastic sheets on which conductive areas or electrodes are printed. An example of such a structure is disclosed in U.S. Pat. No. 4,856,993 to Maness et al. A pressure-sensitive resistive material is located between the two confronting electrodes or conductive areas. When force is applied at confronting electrodes, the pressure-sensitive resistive material reduces in resistance so that current will flow as a function of the force applied. The pressure-sensitive resistive material may thus be described as semiconductive. The change in resistance and current flow may be sensed and utilized by suitable instrumentation described in Maness et al U.S. Pat. No. 4,856,993 and known to the art.

Typically, force sensors are carefully printed to very close tolerances and require careful overprinting of the semiconductive material as well. Conductive electrodes may be disposed as crossing grids as shown by U.S. Pat. No. 4,856,993. Another pattern uses a button-like conductive area on each of two plastic sheets with each of the conductive areas being connected to a lead also patterned onto the corresponding plastic sheet. A pattern of semiconductive material corresponding to the conductive area is printed on one or both of the conductive areas. Adhesive is used to hold the two sheets together, and the resulting adhesive layer is disposed around the pattern of the conductive and semiconductive materials and outside of the sensing zones of the force sensor.

The above described force sensors and related methods for making them suffer from various drawbacks and disadvantages. For example, the need to selectively print a pattern of conductive material onto the plastic sheets, as by silk-screening, is not only time consuming, but also requires substantial precision in the printing, irrespective of what pattern is being applied. In addition, since the electrode patterns on the confronting surfaces of the sheets are generally somewhat different from each other, a separate, specifically designed screen or tooling is required for each of the patterns. Yet another specifically designed screen is also required for applying the semiconductive material in the appropriate pattern.

The required precision, tooling and selective printing operations make manufacturing complicated and costly. The required precision in printing may often lead to an undesirably high percentage of scrap material being generated during the process of making force sensors according to prior art techniques.

There is thus a need for a force sensor of a simple, yet effective, construction and made by a simplified method.

SUMMARY OF THE INVENTION

Accordingly, an object of this invention is to provide a force sensor which requires less tooling, time, and precision in its manufacture.

Further, it is an object that the force sensor be made in a simplified manufacturing process.

According to the present invention, the foregoing and other objects and advantages are attained by a method of making a force sensor which involves providing first and second backing sheets each with conductive ink layers and providing at least one of the conductive layers with a semiconductive material. A non-conductive material is interposed in a selected pattern between the conductive layers. The pattern defines at least one sensing area devoid of non-conductive material. Electric current is only able to flow through the semiconductive layer when a force component is exerted orthogonally to the backing sheets at a location corresponding to the area devoid of non-conductive material.

A laminated force sensor according to the present invention includes two backing sheets substantially overlying each other to form confronting surfaces. A substantially non-patterned layer of conductive ink is disposed on each of the confronting surfaces. Semiconductive material is disposed on at least one of the layers of conductive material. A pattern of non-conductive material is interposed between the confronting surfaces so that electric current flows between the conductive layers only when orthogonal force is applied at a sensing area devoid of non-conductive material, as defined by the pattern.

In a preferred form, the conductive and semiconductive layers substantially uniformly cover the confronting surfaces of the backing sheets. The non-conductive material may be adhesive for securing the confronting surfaces of the backing sheets to each other.

Still other objects, advantages, and features of the present invention will become apparent from the detailed description of the invention that follows, in which the preferred embodiment of the invention is shown by way of illustration of the best mode presently contemplated for carrying out the invention, and by reference to the attached drawings.

BRIEF DESCRIPTION OF THE DRAWINGS

FIG. 1 is a schematic, plan view of a force sensor according to the present invention and connected to a power supply;

FIGS. 2–4 are schematic, sectional views of the force sensor of FIG. 1 taken along lines 2—2, 3—3, and 4—4, respectively;

DETAILED DESCRIPTION

Figure 5:
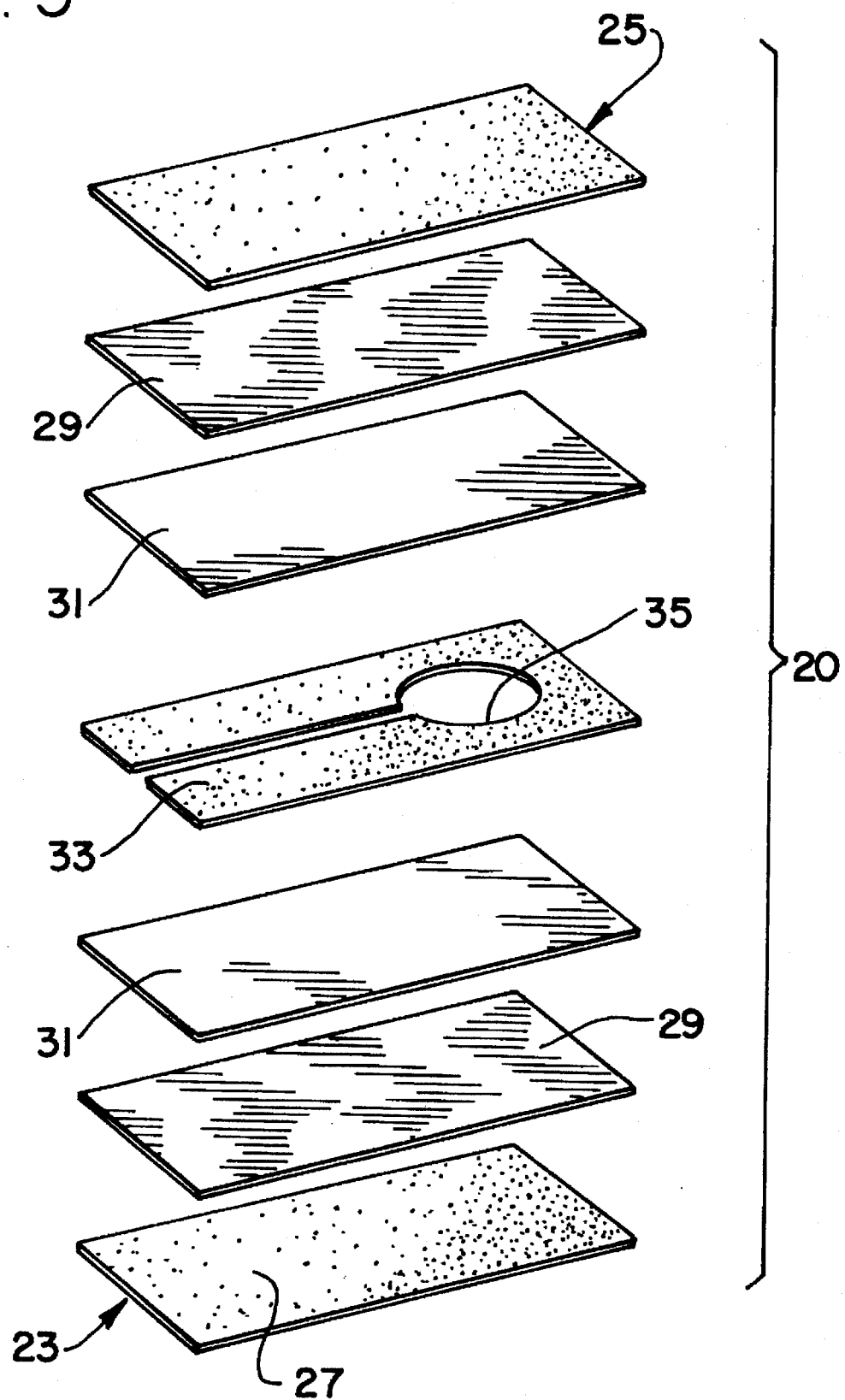
FIG. 5 is an exploded perspective view of the force sensor of FIGS. 1–4.

FIGS. 1–5 show a force sensor 20 according to the present invention. In this particular embodiment, the force sensor 20 is of the "button" type, but it is to be understood that other types of force sensors are within the scope of the present invention. The force sensor 20 includes a first substrate or backing sheet 23 and a second substrate or backing sheet 25. The backing sheets 23, 25 are formed of any suitable, thin flexible insulative polymeric material and, preferably, are of a polyester material such as a transparent Mylar available from Dupont. The backing sheets 23, 25 overlie each other to form a laminate. Thus, the backing sheets 23, 25 have respective inner surfaces 27 which are provided with one or more layers of material as discussed below and which oppose or confront each other.

Figure 6:
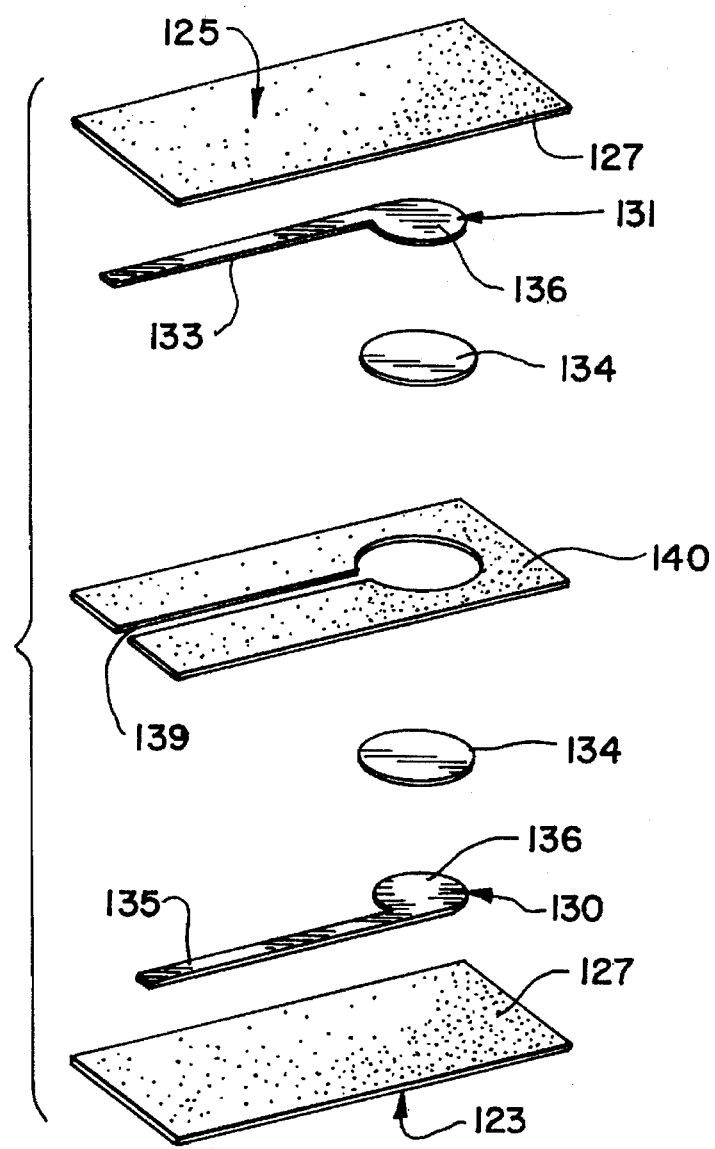
FIG. 6 is an exploded, perspective view of a force sensor of the prior art.

Force sensors of the prior art, as shown in FIG. 6, typically comprise backing sheets 123, 125 and have their confronting surfaces 127 coated, as by screen printing, with patterns 130, 131 of conductive material. The patterns 130, 131 have conductive, force sensing areas 136, and leads 133, 135, respectively, extending therefrom. Leads 133, 135 are out of alignment with each other so that they do not inadvertently come into contact with each other. Semiconductive or pressure sensitive resistive material is likewise disposed, as by screen printing, in preselected patterns 134 on each of the confronting surfaces 127. The semiconductive patterns 134 are selected and positioned so as to coincide with the conductive force sensing areas 136 of the conductive patterns 130, 131. Still referring to FIG. 6, the sheets 123, 125, with their confronting surfaces 127, are secured to each other by means of an adhesive layer 140. The adhesive layer 140 is positioned and disposed so as not to interfere with the conductive path formed between the force sensing button areas 136 and through the semiconductive patterns of material 134. Thus, the adhesive layer 140 surrounds the areas 136 and patterns 134 and may also define a longitudinal space 139 which can serve as an air vent. Space 139 is typically out of alignment with leads 133, 135.

Referring again to FIGS. 1-5, in the present invention, a substantially nonpatterned coating of conductive material is applied to each of the confronting surfaces 27 to form substantially nonpatterned conductive layers 29. In the preferred embodiment, the nonpatterned conductive layer substantially entirely covers the surfaces 27. In other words, the surfaces 27 have been formed with a generally uniform layer of conductive material, as by flood coating. Alternatively, a metallized backing material such as metallized polyester may be used, with the coating being applied by techniques such as vacuum deposition.

In turn, the conductive layers 29 are coated with a substantially nonpatterned coating of semiconductive material to form substantially nonpatterned semiconductive layers 31. In the preferred embodiment, the semiconductive layers 31, like the conductive layers 29, substantially cover the surfaces 27 in a uniform layer, and are applied as by a flood coating process. It will be appreciated that, according to the present invention, only one of the conductive layers 29 need be coated with a semiconductive layer 31.

The coated, confronting surfaces 27 are secured to each other by a non-conductive or insulative adhesive which forms a non-conductive or insulative layer 33. Sufficient adhesive is used in appropriate locations to coat portions of the confronting surfaces with adhesive, but also to have at least one preselected sensing area or space 35 where there is essentially no non-conductive material present. The non-conductive or adhesive layer 33 thus forms a preselected pattern of adhesive and one or more substantially void spaces 35 and, where desired, a vent 39. The non-conductive layer 33 is interposed between the confronting surfaces 27 of the sheets 25 and contacts the semiconductive layers 31 if there are two, or the semiconductive layer and confronting conductive layer if only one semiconductive layer is present.

In use, each of the conductive layers 29 is connected either directly or indirectly to a power supply 37 (FIG. 1) and in accordance with the general principles and typical instrumentation described in Maness et al. U.S. Pat. No. 4,856,993. Since the conductive layers 29 substantially cover the surfaces 27, leads to the power supply 37 may be connected to the layers at any number of points on them, such as along the perimeter of the conductive layers 29. The non-conductive or insulative adhesive is disposed within the layer 33 in sufficient quantities so that force exerted orthogonally to the sheets 25, 27 at locations other than those corresponding to the sensing area 35 will not complete a circuit because of the insular ire effect of the non-conductive material which is interposed between the conductive layers 29. On the other hand, when force is applied to the planar surfaces of the sheets 23, 25 at a location corresponding to a sensing area 35, that force will allow current to flow between the conductive layers 29, so long as the force is sufficient to place the semiconductive layer 31 in a suitably conductive state, i.e., to sufficiently reduce its resistance. In the preferred embodiment shown in FIG. 1, the sensing area defines a circular area or "button" so that the force sensor 20 functions as a so-called button sensor to sense the force applied at the area 35. Of course, the sensor will permit current to flow at a rate proportionate to the applied force, as is well known for such sensors.

The conductive layer 29 is formed using any of a variety of known, conductive inks which are suitable for the particular application of the force sensor 20. The semiconductive or force sensitive material which comprises the semiconductive layer 31 is preferably formed from a resistive ink such as one which includes a mixture of particulate carbon and molybdenum disulfide in a suitable binder. Other inks having other compositions may be used as well.

The adhesive used to create the patterned layer 33 may be any of a variety of adhesives which are substantially non-conductive or insulative and is, preferably, a pressure-sensitive membrane switch adhesive such as MEM Screen Printing Adhesive available from A.W.T. World Trade, Inc., 4312 N. Knox Avenue, Chicago, Ill. 60641. While the backing sheets 23, 25 and the various layers 29, 31, 33 may be any of a variety of thicknesses to suit particular applications, one preferred force sensor 20 is 0.00365 inch thick and the various layers have the following thicknesses: backing sheets 0.001 inch each; conductive layers 0.00025 inch each; semiconductive layers 0.00045 inch each; and non-conductive adhesive 0.00025 inch.

Figure 7:
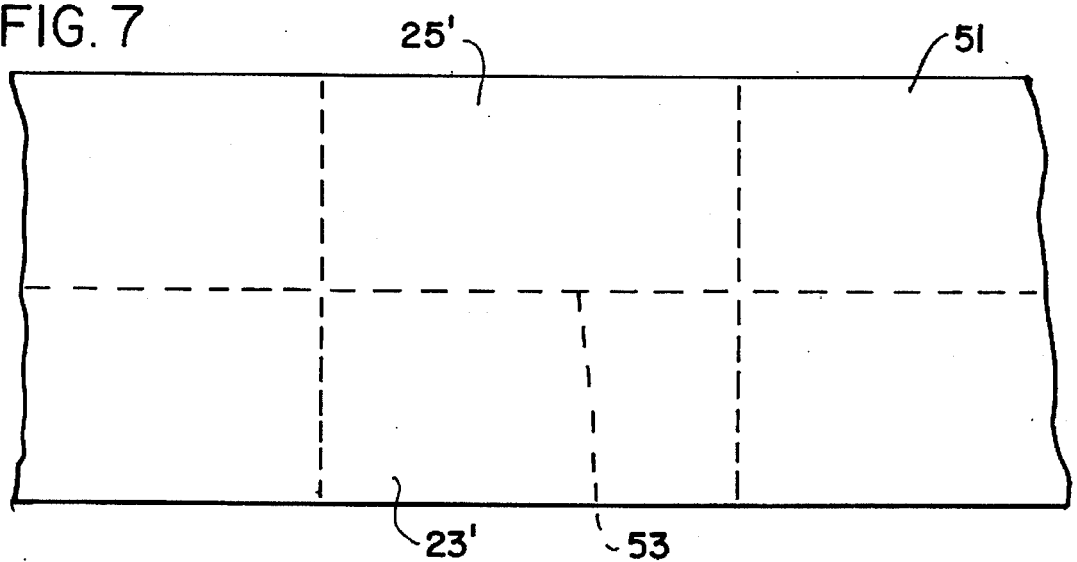
FIG. 7 is a planar view of a web from which the force sensor of FIGS. 1–5 may be made according to one aspect of the present invention.

The force sensor 20 shown in FIGS. 1-5 is made by juxtaposing two backing sheets having disposed thereon the conductive and semiconductive layers 29, 31 and the adhesive/insulative or non-conductive layer 33. The force sensor 20 may be made by folding over adjacent portions 23', 25' of a larger sheet or web 51 of Mylar as illustrated by FIG. 7. Reference to a web in this application is intended to include any planar structure, whether in roll, web, sheet or other form, from which multiple backing sheets may be formed. The portions 23', 25' which have been appropriately coated with the layers 29, 31 are provided with layer 33, and are then folded along edge 53 to form a laminate. The portions 23' and 25' may be separated from the web 51, such as by die-cutting, to form separate elements which, when juxtaposed with a layer 33 therebetween, may be secured to form a laminated force sensor 20.

Web 51 may be cut into multiple portions to form multiple force sensors.

Alternately, two separate webs 51, or portions thereof, may be appropriately coated with the conductive layers 29 and one or both with a semiconductive layer 31, and such separate portions may then be secured to each other by an appropriately patterned layer of non-conductive adhesive.

While the force sensor 20 described above is a so-called button-type sensor, the pattern of non-conductive adhesive may be altered in any manner appropriate to the particular force sensing application. In one such alternative, instead of a single sensing area 35, multiple void areas may be created in the adhesive layer 33 to produce multiple sensing areas. Of course, in such a case it will not usually be possible to discriminate among the areas to which force may be applied.

Although the adhesive acts as the non-conductive material in the preferred embodiment, the non-conductive material could be separate from the adhesive and be any other material, applied as a coating or as a preform, so long as the coating or preform, when interposed between the conductive layers 29, restricts current flow between the layers 29 to the sensing area or areas 35 as discussed previously.

In other embodiments, the conductive material need not be substantially coextensive with the surfaces 27 of the force sensor 20, but rather can be applied in any number of arrangements which are substantially uniform and non-patterned, and which entirely depend upon the applied non-conductive material to define the force sensing zone or zones.

In addition to the advantages apparent from the foregoing description, the force sensor 20 according to the present invention is easier to manufacture and has a simpler structure. There is no need to deposit patterned conductive layers 130, 131 and patterned semiconductive layers 134 as is done in the prior art. In accordance with the present invention, coating of the backing sheets 23, 25 thus is accomplished more quickly and special screens or tooling are not required for the deposition of the conductive and semiconductive layers 29, 31. Instead, the non-conductive material used is interposed in a selected pattern between the backing sheets. Thus, the pattern of a single layer, the non-conductive layer 33, is used to define and determine the force sensing area or areas through which current flows when force is applied at those areas.

As a further advantage, the backing sheets 23, 25 may be manufactured from webs of Mylar or other insulative polymeric material which have been uniformly coated with conductive material and, as appropriate, with semiconductive material. Backing sheets formed from such webs may be used to create force sensors with any pattern of force sensing areas appropriate to the particular application. In other words, the coated backing sheets 23, 25 may be mass produced from webs of plastic sheets coated over their entire surfaces and used to form a variety of different force sensors merely by varying the pattern of the non-conductive layer 33. This means that when changes in the configuration of a force sensor 20 are required, the only "retooling" which may be necessary is that used to create the patterned non-conductive layer.

While the present invention has been described with reference to a preferred embodiment thereof, illustrated in the accompanying drawings, various changes and modifications can be made by those skilled in the art without departing from the spirit and scope of the present invention; therefore, the appended claims are to be construed to cover equivalent structures.

What is claimed is:

1. A laminated force sensor comprising:
   two backing sheets substantially overlying each other, each having a substantially non-patterned, conductive confronting surface deposited thereon;
   a substantially non-patterned semiconductive layer deposited on at least one of the conductive surfaces; and
   a pattern of non-conductive material interposed between the confronting surfaces of the backing sheets and contacting the semiconductive layer, the pattern defining at least one sensing area devoid of non-conductive material, said sensing area confronting said semiconductive layer;
   whereby electric current will flow between the conductive layers only when a force component is exerted orthogonally to the backing sheets at a location corresponding to the sensing area devoid of non-conductive material.

2. The laminated force sensor of claim 1, and wherein there is a substantially non-patterned semiconductive layer on each of the conductive surfaces.

3. The laminated force sensor of claim 1, and wherein the conductive surfaces are substantially coextensive with the confronting surfaces.

4. The laminated force sensor of claim 1, wherein each semiconductive layer is substantially coextensive with the conductive surfaces.

5. The laminated force sensor of claim 1, and wherein the non-conductive material is an adhesive material.

6. The laminated force sensor of claim 5, and wherein the non-conductive material substantially covers the semiconductive layer, and the sensing area forms a button.

7. The laminated force sensor of claim 1, and wherein the backing sheets are formed of flexible polymeric material.

8. The laminated force sensor of claim 7, and wherein the polymeric material comprises polyester sheet material.

9. A laminated force sensor comprising:
   two backing sheets substantially overlying each other, each providing a pair of confronting surfaces;
   a substantially non-patterned conductive layer deposited on each of the confronting surfaces;
   a substantially non-patterned semiconductive layer deposited on at least one of the conductive layers;
   a pattern of non-conductive material interposed between the confronting surfaces of the backing sheets and contacting the semiconductive layer, the pattern defining at least one sensing area devoid of non-conductive material, said sensing area confronting said semiconductive layer;
   whereby electrical current will flow between the conductive layers only when a force component is exerted orthogonally to the backing sheets at a location corresponding to the sensing area devoid of non-conductive material.

10. The laminated force sensor of claim 1, and wherein the non-conductive material is adhesive.

11. A laminated force sensor comprising:
    two, thin, flexible backing sheets substantially overlying each other, each having a surface which confronts the surface of the other, each of said surfaces having a uniform, nonpatterned layer of conductive ink deposited thereon, and a uniform, non-patterned semiconductive layer deposited on at least one of the layers of conductive ink; and
    a pattern of non-conductive material interposed between the confronting surfaces of the backing sheets and confronting the semiconductive layer, the pattern defining at least one sensing area devoid of non-conductive material, said sensing area confronting said semiconductive layer;
    whereby when a force component is exerted orthogonally to the backing sheets at a location corresponding to the sensing area devoid of non-conductive material, current will flow between said conductive layers through said semiconductive layer and when a force component is applied orthogonally to the backing sheets at other locations, current will not flow between said conductive layers through said semiconductive layer.

12. A method of making a laminated force sensor comprising:
    providing first and second backing sheets having uniformly deposited conductive ink layers, each of the conductive ink layers being adapted to be electrically connected to a source of electric current and each of the backing sheets defining an outer perimeter surrounding the conductive ink layers;

providing at least one of the conductive layers with a uniformly applied semiconductive material to form a semiconductive layer; and interposing non-conductive material in a selected pattern between the conductive layers and confronting the semiconductive layer, the pattern defining at least one sensing area devoid of non-conductive material;

whereby electric current will flow through the semiconductive layer only when a force component is exerted orthogonally to the backing sheets at a location corresponding to the area devoid of non-conductive material.

13. The method in accordance with claim 12, and further comprising the step of electrically connecting the sensing area to a power supply by connecting the power supply to any points within said outer perimeters.

14. The method in accordance with claim 12, and wherein the non-conductive material is adhesive, and further including the step of securing the backing sheets to each other with said non-conductive material.

15. The method in accordance with claim 12, and the step of providing each of the conductive layers with a uniformly applied semiconductive material to form two semiconductive layers.

16. The method in accordance with claim 12, and wherein the step of providing the backing sheets comprises the step of providing flexible backing sheets formed of polymeric material.

17. The method in accordance with claim 16, and wherein the polymeric material is a polyester sheet material.

18. The method in accordance with claim 12, and wherein the step of providing the backing sheets further comprises providing the backing sheets with uniform deposits which substantially entirely cover the backing sheets.

19. The method in accordance with claim 12, and wherein said backing sheets are formed from a web of polymeric material having a substantially non-patterned conductive ink layer thereon.

20. The method in accordance with claim 12 further comprising the steps of providing backing sheets which are attached to each other along a common edge and folding the backing sheets along said common edge so that the conductive layers confront each other.

21. A method of making a force sensor comprising:

substantially covering a pair of insulative, flexible, polymeric surfaces with electrically conductive ink to form a pair of non-patterned conductive layers;

substantially covering at least one of the conductive layers with a non-patterned semiconductive material layer; and securing the surfaces in an opposed relationship to each other with a patterned layer of non-conductive material which substantially covers the surfaces except for a preselected sensing area, thereby limiting conduction between the conductive layers to the preselected sensing area.

* * * * *

UNITED STATES PATENT AND TRADEMARK OFFICE
CERTIFICATE OF CORRECTION

PATENT NO.  : 5,629,488
DATED       : May 13, 1997
INVENTOR(S) : Harry C. Kropp

It is certified that error appears in the above-indentified patent and that said Letters Patent is hereby corrected as shown below:

Col. 4, line 1, change "the insular ire effect" to
     -- the insulative effect --.

Signed and Sealed this

Twenty-second Day of July, 1997

Attest:

BRUCE LEHMAN

Attesting Officer     Commissioner of Patents and Trademarks